(12) United States Patent
Ganu et al.

(10) Patent No.: US 9,936,441 B2
(45) Date of Patent: Apr. 3, 2018

(54) INFRASTRUCTURE-ASSISTED CLIENT MANAGEMENT USING SYNTHESIZED BEACON REPORTS

(75) Inventors: Sachin Ganu, San Jose, CA (US); Pradeep Iyer, Cupertino, CA (US); Partha Narasimhan, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 13/195,720

(22) Filed: Aug. 1, 2011

(65) Prior Publication Data

US 2013/0036188 A1 Feb. 7, 2013

(51) Int. Cl.
H04W 48/02 (2009.01)
H04W 48/20 (2009.01)
H04W 12/08 (2009.01)

(52) U.S. Cl.
CPC ........... *H04W 48/02* (2013.01); *H04W 12/08* (2013.01); *H04W 48/20* (2013.01)

(58) Field of Classification Search
CPC ...... H04W 48/20; H04W 48/02; H04W 12/08
USPC ....................................................... 709/217
See application file for complete search history.

(56) References Cited

U.S. PATENT DOCUMENTS

| | | | |
|---|---|---|---|
| 7,181,211 B1 | 2/2007 | Phan-Anh | |
| 7,340,247 B1 * | 3/2008 | O'Hara et al. | 455/418 |
| 7,929,508 B1 * | 4/2011 | Yucek et al. | 370/338 |
| 7,948,953 B2 | 5/2011 | Melkote et al. | |
| 8,363,617 B2 | 1/2013 | Meyer | |
| 8,401,554 B2 | 3/2013 | Melkote et al. | |
| 8,483,169 B2 | 7/2013 | Melkote et al. | |
| 8,599,793 B2 | 12/2013 | Thomson | |
| 2003/0112766 A1 | 6/2003 | Riedel et al. | |
| 2004/0047324 A1 | 3/2004 | Diener | |
| 2004/0125923 A1 | 7/2004 | See et al. | |
| 2004/0204114 A1 * | 10/2004 | Brennan et al. | 455/562.1 |
| 2004/0246922 A1 | 12/2004 | Ruan et al. | |
| 2004/0248610 A1 | 12/2004 | Chan | |
| 2005/0068928 A1 | 3/2005 | Smith et al. | |
| 2005/0130650 A1 | 6/2005 | Creamer et al. | |
| 2005/0201330 A1 | 9/2005 | Park et al. | |

(Continued)

OTHER PUBLICATIONS

Final Office Action, U.S. Appl. No. 11/305,910, dated Jul. 21, 2007, pp. 1-25.

(Continued)

*Primary Examiner* — Asad Nawaz
*Assistant Examiner* — Saad A Waqas
(74) *Attorney, Agent, or Firm* — Hewlett Packard Enterprise Patent Department

(57) ABSTRACT

Infrastructure-based client management uses synthesized beacon reports to effect client association with APs in a wireless digital network. Beacon reports are synthesized by having a plurality of APs in the network collect client reports and send those reports to a report process on the network. The report process accumulates client reports from the plurality of APs and selects one or more candidate APs to support a client. Selection may be made on reported SNR, AP loading, channel loading, AP characteristics, or a combination. The report process may produce blacklists and optionally whitelists for use by APs to use in processing client probe and connection requests.

32 Claims, 1 Drawing Sheet

(56) References Cited

U.S. PATENT DOCUMENTS

| | | |
|---|---|---|
| 2006/0067290 A1 | 3/2006 | Miwa et al. |
| 2006/0128392 A1 | 6/2006 | Turina et al. |
| 2006/0165103 A1 | 7/2006 | Trudeau et al. |
| 2006/0223503 A1 | 10/2006 | Muhonen et al. |
| 2007/0104126 A1* | 5/2007 | Calhoun et al. ............. 370/328 |
| 2007/0201404 A1 | 8/2007 | Cheon et al. |
| 2007/0249386 A1* | 10/2007 | Bennett ..................... 455/550.1 |
| 2008/0070586 A1 | 3/2008 | Kermoal et al. |
| 2008/0261602 A1 | 10/2008 | Livneh |
| 2008/0318576 A1 | 12/2008 | So et al. |
| 2009/0070694 A1 | 3/2009 | Ore et al. |
| 2009/0316655 A1 | 12/2009 | Prakash et al. |
| 2010/0069072 A1 | 3/2010 | Gogic et al. |
| 2010/0118830 A1 | 5/2010 | Stephenson et al. |
| 2010/0322198 A1* | 12/2010 | Friday et al. ................. 370/332 |
| 2011/0087882 A1* | 4/2011 | Kuo et al. ..................... 713/156 |
| 2011/0096738 A1* | 4/2011 | Choi ............................ 370/329 |
| 2011/0292898 A1* | 12/2011 | Wu et al. ...................... 370/329 |
| 2012/0051353 A1 | 3/2012 | Aragon et al. |
| 2012/0210001 A1 | 8/2012 | Ryerson et al. |
| 2012/0282968 A1 | 11/2012 | Toskala |
| 2013/0036188 A1 | 2/2013 | Ganu et al. |
| 2013/0041981 A1 | 2/2013 | Kim et al. |
| 2013/0265943 A1 | 10/2013 | Melkote et al. |
| 2013/0308447 A1 | 11/2013 | Cheng et al. |
| 2014/0211756 A1 | 7/2014 | Bontu et al. |
| 2015/0172998 A1 | 6/2015 | Tervonen et al. |

OTHER PUBLICATIONS

Final Office Action, U.S. Appl. No. 11/305,910, dated Oct. 5, 2010, pp. 1-21.

Ganu, et al.; "Non-Final Office Action issued in U.S. Appl. No. 15/138,663"dated Nov. 17, 2016; 11 pages.

Non-Final Office Action, U.S. Appl. No. 11/305,910, dated Jan. 14, 2009, pp. 1-21.

Non-Final Office Action, U.S. Appl. No. 11/305910, dated Dec. 10, 2009, pp. 1-26.

Non-Final Office Action, U.S. Appl. No. 13/069,218, dated Feb. 15, 2012, pp. 1-25.

Notice of Allowance, U.S. Appl. No. 11/305,910, dated Jan. 20, 2011, pp. 1-15.

Supplemental Notice of Allowability, U.S. Appl. No. 11/305,910, dated Mar. 8, 2011, pp. 1-6.

Non-Final Office Action in U.S. Appl. No. 13/195,720 dated Feb. 8, 2013, 15 Pgs.

* cited by examiner

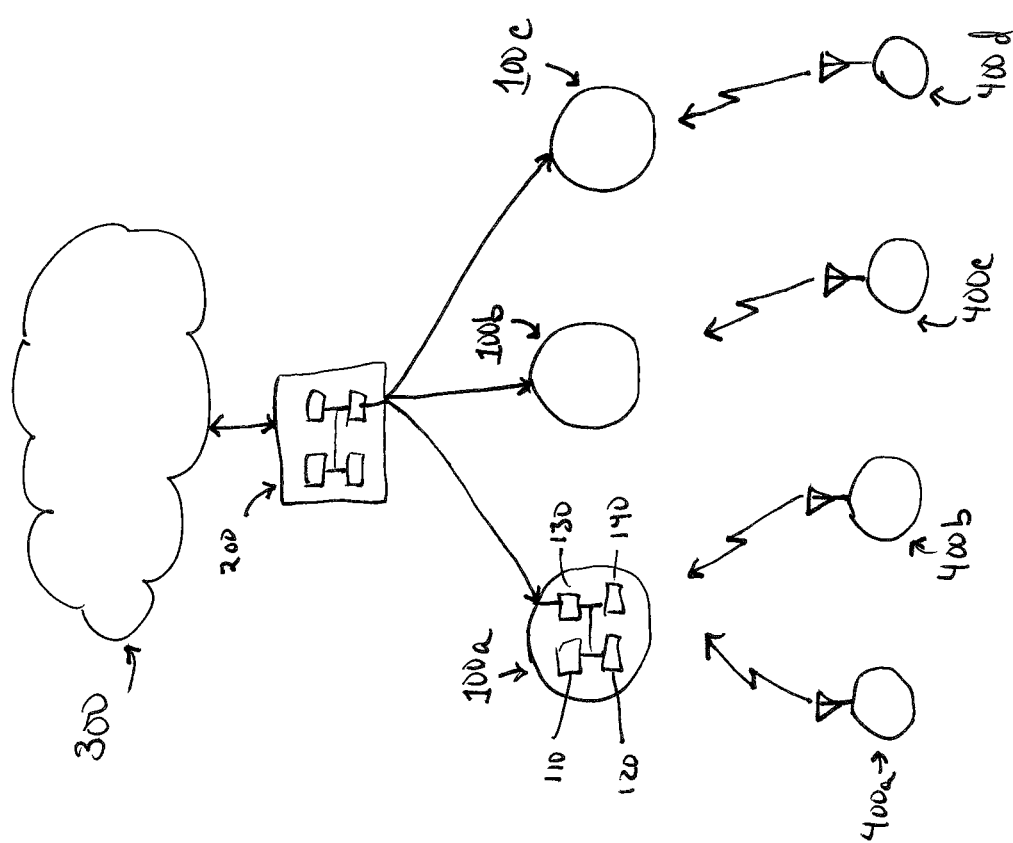

INFRASTRUCTURE-ASSISTED CLIENT MANAGEMENT USING SYNTHESIZED BEACON REPORTS

BACKGROUND OF THE INVENTION

The present invention relates to wireless digital networks, and more particularly, to the problem of client association management.

Wireless local area networks (WLANs) are becoming ubiquitous. Particularly in locations such as school and businesses, there may be a number of wireless access points (APs) present in an area, each providing basic service sets (BSS) to associated clients (known in the standards as stations, STA).

The challenge in managing the WLAN is to manage client association, providing the "best" association between client (STA) and AP providing a BSS.

There are a bewildering number of mechanisms for assisting with this process. Some infrastructure vendors have client software which enables coordination between APs and clients to negotiate a suitable BSS for association. However, most client devices, particularly older client devices, lack this software support. In such cases, the 802.11 infrastructure, the WLAN, has to infer the information about the client's view of the network, and select the proper candidate BSS to handle the client.

The IEEE 802.11k standard (IEEE Std. 802.11k-2008), incorporated herein by reference in its entirety, has proposed different mechanisms on both the 802.11 client and the 802.11 infrastructure so that they are able to co-operatively establish associations with the best BSSID in the client's vicinity. This is done using the 802.11k Beacon Report Information Element that is sent by the 802.11 client (STA) to the infrastructure (AP) in response to a Beacon Request from the AP. The Beacon Report consists of a list of BSS and their properties that the client is able to sense in its vicinity. This provides a standardized mechanism to enable the 802.11 infrastructure to take into account the client's network view to appropriately serve the client via the best available AP/BSS.

Since this standard is relatively new and the implementation optional, there are only a few client devices and drivers that support sending Beacon Reports. In the absence of this information, the infrastructure has to infer this based on observations of client traffic.

What is needed is a method of synthesizing Beacon Reports and using these synthesized reports to assist with the proper association of clients to APs in a WLAN.

BRIEF DESCRIPTION OF THE DRAWINGS

The invention may be best understood by referring to the following description and accompanying drawings that are used to illustrate embodiments of the invention in which: the view shows devices in a network.

DETAILED DESCRIPTION

Embodiments of the invention relate to methods of infrastructure-based client management. Access points (APs) maintain tables of client information, sending this client information to a report process, the report process maintaining a table of all client information received from supported APs. The report process may run on a controller associated with the APs, a dedicated host on the network, or it may run on one of the APs. The report process processes the client reports to determine a candidate AP or set of APs for a client and forwards this information to APs in the group. The information forwarded to APs in the group may be in the nature of blacklist reports to APs instructing APs not to associate the client to the AP. The information forwarded to APs in the group may be in the nature of whitelist reports indicating that APs are to respond to the client. APs use these reports to steer association of clients.

According to the present invention and as shown in FIG. 1, access points (APs) 100a, 100b, 100c communicate with controller 200, which in turn communicates with network 300. APs 100 support wireless client devices 400a, 400b, 400c, 400d.

As is understood in the art, APs 100 are purpose-built digital devices, each containing a processor 110, memory hierarchy 120, and input-output interfaces 130 140. In one embodiment of the invention, a MIPS-class processor 110 such as those from Cavium or RMI is used. Other suitable processors, such as those from Intel, ARM, or AMD may also be used. The memory hierarchy 120 traditionally comprises fast read/write memory for holding processor data and instructions while operating, and nonvolatile memory such as EEPROM and/or Flash for storing files and system startup information. Wired interfaces 130 are typically IEEE 802.3 Ethernet interfaces, used for wired connections to other network devices such as switches, or to a controller. Wireless interfaces 140 are typically IEEE 802.11 wireless interfaces. In one embodiment of the invention, access points 100 operate under control of a LINUX operating system, with purpose-built programs providing host controller and access point functionality. Controller 200 is a similar purpose-built digital device containing a similar hierarchy of processor, memory, and input-output interfaces.

Similarly, wireless clients 400a, 400b, 400c, 400d are digital devices each containing a processor, memory, wireless interface, and other interfaces as needed. Examples of wireless clients include but are not limited to handheld wireless devices such as tablets, bar-code scanners, Wi-Fi phones or communicators, computers including netbooks, notebooks, laptops, and desktop computers, as well as wireless infrastructure devices such as cameras, scales, and instruments.

According to the present invention, synthesis of Beacon Reports begins with gathering client information from the WLAN infrastructure. APs maintain a client table which is shared among the radios in the AP. As is known to the art, an AP may contain multiple radio transceivers, for example, for 2.4 GHz and 5 GHz wireless bands. Upon receiving a probe request or Auth from a client device, the AP measures the signal to noise ratio (SNR) or equivalent of the received frame. If this is a new client, as identified by the client MAC address in the received frame, an entry is added to the client table including at least the client MAC, the SNR of the received frame, and a timestamp. Other information such as channel and band may also be recorded. If the client MAC already existed in the table, entries for that client MAC are updated.

The client table in the AP may be of limited size, for example 128 entries, with entries aged out as the table fills.

The AP sends a client report to the report process. As an example, this may occur periodically, such as every second. Sending a client report may be triggered on events, such as updates or additions to the client table, or a combination of time and events. The client report contains at least a list of client MAC addresses and the associated SNRs or equivalent, and may include additional information such as timestamp, channel and/or band. The client report may also contain AP specific information such as channel noise floors, channel loading, AP capabilities, and the like.

This client reporting process is repeated by the APs 100a, 100b, 100c, 100d on the network.

According to the invention, a report process is present on the network. The report process may be hosted by controller 200, for example, or if no controller is present in the network, the report process may be hosted by one of the APs 100. The report process may be also present on a dedicated host on the network. The location of the report process does not matter so long as it is capable of receiving reports from APs and sending data back to those APs.

The report process maintains a client reports table for aggregating client reports received from APs. Each table entry contains a client MAC address and data for different APs, with multiple APs per client. The data per AP may be as simple as SNR plus timestamp, or may include additional information such as channel number and/or band, and other dedicated AP information such as noise floor, AP capabilities, AP loading, and the like. As client reports are received from APs, the report process updates the table entry for that client and the SNR or equivalent from the particular AP with its timestamp. New client entries are created as needed. In this manner an entry for a single client will contain SNR reports from multiple APs, each SNR report having an associated timestamp.

The client reports table may also be limited in size, such as 4096 entries. The specific implementation of the client reports table will depend on the processor architecture and memory capacity of the device.

According to the invention, the client reports table may be used in determining a candidate AP or set of APs for a particular client. Data in the client reports table may be evaluated in different ways to determine what is best.

As an example, for a given client, find the AP/BSS which reported the strongest SNR from that client. This SNR weighting may be optionally time-weighted so that only recent SNR values, within a predetermined period, are used and values older in time are ignored. Such a selection may result in a single AP/BSS being identified, or a list of the top n APs/BSS may be identified.

In another example where channel utilization is available to the report process, such as through inclusion in the client reports, or separate tracking of channel utilization, the AP/BSS which is least loaded may be selected. Load may be measured in terms of the number of clients associated with a particular AP, and/or channel utilization reported. Similarly, AP noise floor may be used or included in such a calculation.

In another similar example, the AP/BSS on a suitable band (2.4 GHz vs. 5 GHz) for the client is selected. This selection may be based on characteristics such as band or channel loading, noise floor, AP characteristics such as supported bandwidth, or the like. If, for example, a client has only reported SNRs for one band, it can be assumed that this client is single-band only. Often band capability may be inferred by examining the OUI portion of the client MAC address. Similarly, an AP which is operating high bandwidth channels would not be a good candidate for a client device which only supports older legacy 802.11b modes.

In another example, for clients which have recorded SNRs of APs across different channels and different bands, one or more candidate APs/BSS may be selected using a combination of the aforementioned criteria.

In another embodiment, candidate APs may be selected on the basis of policy. As an example, policy may allocate devices to different APs based on device type, which may be inferred from the OUI-portion of the client MAC address, as well as from other client characteristics. Handheld devices such as smart phones and tablets may be directed to one group of APs and laptops to another set of APs. Similarly, devices capable of high-bandwidth modes may be directed to APs which support those high-bandwidth modes, while lower-bandwidth devices are directed away from those high-bandwidth APs. Other policy-based decisions may be based on location, on time of day, or other criteria.

Further according to the invention, upon receiving a client update from an AP, the report process updates the set of best AP/BSS candidates for all clients which are associated with an AP and sends a report to that AP for the AP to use in client association.

In one embodiment of the invention, the report process produces blacklist reports for each AP. Examining each client, if the currently associated AP is not one of the candidate APs/BSS, then the report process includes that particular client information (the client MAC address) in the blacklist report for that AP. The report process repeats this procedure for all clients associated to the AP and then sends a client blacklist report to the AP. This client blacklist report may be sent to the AP as example in response to the client update received from the AP.

In this embodiment, each AP maintains a blacklist table. This table may be of limited size, such as 128 entries, and contains at least client MAC addresses and timestamps. Entries may be aged out of the table, for example after a predetermined time such as 30 seconds. Whenever the AP receives a blacklist report from the report process, the AP adds clients and timestamps to its blacklist table, or updates the timestamp for a client entry of a client MAC address is already present in the table. This blacklist table is used to influence clients away from the AP/BSS that is not appropriate, as determined by the report process.

As an example, when the AP receives a probe request from a client that is on the blacklist and has not aged out, the AP does not send a probe response.

When an AP receives an AUTH request from a client on the blacklist that has not aged out, the AP may choose to not respond, or it may respond with a response code indicating the AP/BSS is loaded or full and cannot accept more connections.

When an AP receives an Assoc Request from a client on the blacklist that has not aged out, the AP sends an Assoc Response indicating that the AP/BSS is loaded or full and cannot accept more connections.

In addition to the embodiment of producing and propagating client blacklists for non-candidate APs, the report process may also generate and propagate client whitelists to corresponding client APs. In the case of a whitelist, an AP only responds to clients which are on the whitelist.

It should be understood that the steps and processes of the present invention are performed in a plurality of APs on a wireless network, with the report process being hosted on a suitable device on the network such as a controller, a dedicated host, or an access point. Similarly, the client device may be a laptop or desktop computer, tablet, handheld device, or fixed-function device capable of performing the methods described herein.

The present invention may be realized in hardware, software, or a combination of hardware and software. A typical combination of hardware and software may be a network server or access point with a computer program that, when being loaded and executed, controls aspects of the access point and the report process such that they carry out the methods described herein.

The present invention also may be embodied in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A non-transitory machine readable medium comprising instructions which, when executed by at least one hardware processor on one or more of a plurality of access points, causes performance of operations comprising collecting client data for a client device, the client data comprising characteristics of wireless signals, wherein the wireless signals are received from the client device by one or more of the plurality of access points;
   using at least the client data, based on the wireless signals received from the client device by the plurality of access points, to select at least one access point from the plurality of access points to provide network access to the client device;
   causing the at least one access point to provide the network access to the client device by preparing a blacklist report for each of the plurality of access points, the blacklist report for an access point including client devices for which the access point was not selected to provide network access to the client device and transmitting the blacklist report to the access point to cause the access point to ignore requests from client devices included in the blacklist report.

2. The medium of claim 1, wherein selecting the at least one access point comprises selecting a particular radio interface on the at least one access point and wherein causing the at least one access point to provide the network access to the client device comprises causing the at least one access point to use the particular radio interface to provide network access to the client device.

3. The medium of claim 1, wherein selecting the at least one access point comprises selecting a particular radio interface on the at least one access point different than a second radio interface currently being used by the at least one access point to provide network access to the client device; and wherein causing the at least one access point to provide the network access to the client device comprises causing the at least one access point to use the particular radio interface to provide network access to the client device instead of the second radio interface.

4. The medium of claim 1, wherein the wireless signals were received from the client device by the plurality of access points while the client device was associated with one of the plurality of access points for obtaining the network access.

5. The medium of claim 1, wherein the wireless signals were received from the client device by the plurality of access points before the client device associates with any of the plurality of access points for obtaining the network access.

6. The medium of claim 1, wherein selecting the at least one access point comprises selecting the at least one access point that is different than an access point currently providing network access to the client device.

7. The medium of claim 1, wherein selecting the at least one access point to provide network access to the client device comprises selecting a particular Basic Service Set (BSS) supported by the at least one access point, of a plurality of BSSs, for providing access to the client device.

8. The medium of claim 1, wherein selecting the at least one access point to provide network access to the client device is based on a Signal-To-Noise Ratio of at least two wireless signals received by at least two access points, respectively, of the plurality of access points.

9. The medium of claim 1, wherein selecting the at least one access point to provide network access to the client device is based on balancing a load across two or more of the plurality of access points.

10. The medium of claim 1, wherein selecting the at least one access point to provide network access to the client device is based on bandwidth capabilities of the client device and bandwidth capabilities of the at least one access point.

11. The medium of claim 1, wherein the wireless signals comprise a first wireless signal transmitted by the client device on a first channel and a second wireless signal transmitted by the client device on a second channel that is different than the first channel.

12. The medium of claim 1, wherein causing the at least one access point to provide the network access to the client device comprises configuring access points other than the at least one access point to decline network access to the client device.

13. A system comprising a plurality of access points, wherein each of the access points in the plurality of access points comprises a hardware processor, wherein one or more of the hardware processors are configured to perform operations comprising:
   collecting client data for a client device, the client data comprising characteristics of wireless signals, wherein the wireless signals are received from the client device by a corresponding access points in the plurality of access points;
   using at least the client data, based on wireless signals received from the client device by the plurality of access points, to select at least one access point from the plurality of access points to provide network access to the client device;
   causing the at least one access point to provide the network access to the client device by preparing a blacklist report for each of the plurality of access points, the blacklist report for an access point including client devices for which the access point was not selected to provide network access to the client device and transmitting the blacklist report to the access point to cause the access point to ignore requests from client devices included in the blacklist report.

14. The system of claim 13, wherein selecting the at least one access point comprises selecting a particular radio interface on the at least one access point different than a second radio interface currently being used by the at least one access point to provide network access to the client device; and wherein causing the at least one access point to provide the network access to the client device comprises causing the at least one access point to use the particular radio interface to provide network access to the client device instead of the second radio interface.

15. The system of claim 13, wherein the wireless signals were received from the client device by the plurality of access points while the client device was associated with one of the plurality of access points for obtaining the network access.

16. The system of claim 13, wherein the wireless signals were received from the client device by the plurality of access points before the client device associates with any of the plurality of access points for obtaining the network access.

17. The system of claim 13, wherein selecting the at least one access point comprises selecting the at least one access point that is different than an access point currently providing network access to the client device.

18. The system of claim 13, wherein selecting the at least one access point to provide network access to the client device comprises selecting a particular Basic Service Set (BSS) supported by the at least one access point, of a plurality of BSSs, for providing access to the client device.

19. The system of claim 13, wherein selecting the at least one access point to provide network access to the client device is based on a Signal-To-Noise Ratio of at least two wireless signals received by at least two access points, respectively, of the plurality of access points.

20. The system of claim 13, wherein selecting the at least one access point to provide network access to the client device is based on balancing a load across two or more of the plurality of access points.

21. The system of claim 13, wherein selecting the at least one access point to provide network access to the client device is based on bandwidth capabilities of the client device and bandwidth capabilities of the at least one access point.

22. The system of claim 13, wherein the wireless signals comprise a first wireless signal transmitted by the client device on a first channel and a second wireless signal transmitted by the client device on a second channel that is different than the first channel.

23. The system of claim 13, wherein selecting the at least one access point comprises selecting a particular radio interface on the at least one access point and wherein causing the at least one access point to provide the network access to the client device comprises causing the at least one access point to use the particular radio interface to provide network access to the client device.

24. A method comprising collecting client data for a client device, the client data comprising characteristics of wireless signals, wherein the wireless signals are received from the client device by a plurality of access points;
using at least the client data, based on wireless signals received from the client device by the plurality of access points, to select at least one access point from the plurality of access points to provide network access to the client device;
causing the at least one access point to provide the network access to the client device by preparing a blacklist report for each of the plurality of access points, the blacklist report for an access point including client devices for which the access point was not selected to provide network access to the client device and transmitting the blacklist report to the access point to cause the access point to ignore requests from client devices included in the blacklist report; wherein the at least one access point comprises a hardware processor.

25. An access point that includes a hardware processor that performs a method comprising:
receiving a blacklist report from a controller, the blacklist report including blacklisted clients whose requests are to be ignored by the access point; maintaining a blacklist table based on the blacklist report; receiving a request from a client device; sending a response to the request only if the client device is not present in the blacklist table;
wherein the method further comprises determining if a blacklisted client included in the blacklist report is present in the blacklist table; if the blacklisted client is not present in the blacklist table, adding the blacklisted client and a time stamp to the blacklist table; and if the blacklisted client is present in the blacklist table, updating the timestamp.

26. The access point of claim 25 wherein the request is a probe request.

27. The access point of claim 25 wherein the request is an AUTH request.

28. The access point of claim 25 wherein the request is an AUTH request and the method further comprises sending a response to the AUTH request with a response code indicating that the access point cannot accept more connections if the client device is present in the blacklist table.

29. The access point of claim 25 wherein the request an Assoc request.

30. The access point of claim 25 wherein the method further comprises aging out blacklisted clients from the blacklist table after a predetermined time.

31. The access point of claim 30 wherein the predetermined time is 30 seconds.

32. The access point of claim 25 wherein the method further comprises receiving a probe request or an AUTH request from the client device; measuring a signal to noise ratio (SNR) of a received frame; determining if the client device is present in a client table maintained by the access point; if the client device is not present in the client table, adding a client MAC address, the SNR, and a timestamp for the client device to the client table; if the client device is present in the client table, updating the SNR and the timestamp for the client device in the client table; and periodically sending a client report that includes data from the client table to the controller.

* * * * *